United States Patent [19]

Schumann et al.

[11] Patent Number: 5,756,033
[45] Date of Patent: May 26, 1998

[54] PROCESS OF MAKING POY POLYESTER FIBER

[75] Inventors: Heinz-Dieter Schumann, Maintal; Ulrich Thiele, Bruchkoebel, both of Germany

[73] Assignee: Zimmer Aktiengesellschaft, Germany

[21] Appl. No.: 796,396

[22] Filed: Feb. 6, 1997

[30] Foreign Application Priority Data

Aug. 1, 1996 [DE] Germany ............ 196 31 069.5

[51] Int. Cl.$^6$ .............. D01D 5/12; D01F 6/16; D01F 6/62
[52] U.S. Cl. .............. 264/210.8; 264/211.12; 528/167; 528/287
[58] Field of Search .............. 264/210.8, 211.12; 528/167, 287

[56] References Cited

U.S. PATENT DOCUMENTS

| | | | |
|---|---|---|---|
| 3,169,944 | 2/1965 | Scott et al. | 528/167 |
| 4,086,208 | 4/1978 | Murayama et al. | 528/167 |
| 4,092,299 | 5/1978 | MacLean et al. | 264/210.8 X |
| 4,113,704 | 9/1978 | MacLean et al. | 264/210.8 X |
| 4,254,018 | 3/1981 | Kowallik et al. | 528/287 X |
| 4,940,559 | 7/1990 | Kretschmann et al. | 264/210.8 X |
| 4,966,740 | 10/1990 | Reese | 264/210.8 X |
| 5,034,174 | 7/1991 | Reese | 264/210.8 X |
| 5,340,517 | 8/1994 | Koschinek et al. | 264/211.12 X |

FOREIGN PATENT DOCUMENTS

| | | |
|---|---|---|
| 263603 | 4/1988 | European Pat. Off. |
| 699700 | 8/1995 | European Pat. Off. |
| 49-125494 | 11/1974 | Japan. |
| 1553020 | 9/1979 | United Kingdom. |

*Primary Examiner*—Leo B. Tentoni
*Attorney, Agent, or Firm*—McDonnell Boehnen Hulbert & Berghoff

[57] ABSTRACT

The present invention is a pre-oriented, undrawn polyester fiber spun with spooling speeds of at least 3,000 m/min., wherein the polyester is a copolymer comprised essentially of ethylene terephthalate units and up to 10 weight % of other dicarboxylic acids or other diols, and carboxy phosphonic acid units of the formula:

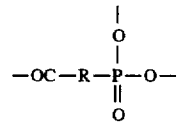

wherein R is selected from $C_{1-10}$-alkylene, $C_{1-10}$-cycloalkylene or $C_{6-10}$-arylene, in a quantity corresponding to 30 to 500 ppm phosphorus, in relation to polyester. The invention also comprises a process for the production of this fiber.

6 Claims, No Drawings

PROCESS OF MAKING POY POLYESTER FIBER

BACKGROUND OF THE INVENTION

Field of the Invention

The present invention relates to a pre-oriented, undrawn polyester fiber (POY fiber), spun at spooling speeds of at least 3,000 m/min., which is well-suited for processing by means of stretch texturing at speeds of over 500 m/min., as well as a process for the production of the same.

Summary of the Related Art

The development of a process for the production of POY polyester fibers, which can be stretch-textured at speeds of over 500 m/min., is of great economic interest, since at these speeds the investment expended per kg of POY fibers is reduced. Furthermore, the speed of fiber production can be significantly increased. A non-modified polyethylene terephthalate with a breaking elongation of approximately 110 to 125% corresponding to a spooling speed of approximately 3200 to 3400 m/min. is necessary for the stretch texturing at approximately 500 m/min. If the spooling speed is increased, the increased orientation of the fibers reduces elongation, which, in turn, compels a reduction of the stretch texturing speed. Ultimately, texturing becomes impossible since the fiber capillaries break under the torsion stressing.

An increase in the stretch texturing speed may be accomplished by the addition of up to 10 meq/kg of certain chain-branching substances, such as pentaerytlrite, trimethylolpropane, mellitic acid or timer acid (GB patent number 1 553 020), trimesinic acid or trimellitic acid (European patent number EP 0 263 603), or tetraethyl silicate (U.S. Pat. No. 4,966,740), during the production of polyester. The use of the polyhydroxy compounds limits the texturing speed to less than 200 m/min. The addition of polycarboxylic acids or tetraethyl silicate produces fiber of varying quality due to the formation of volatile ethylene glycol esters or decomposition through reaction water, respectively. All of these chain-branching additives are to some degree toxic. Decreased texturing speed and increased fluctuations in fiber quality and toxicity are some of the disadvantages of the chain branching substances of the prior art.

In the production of polyester, it is generally known to add carboxy phosphonic acid compounds of the formula:

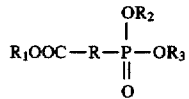

after the reesterification process but prior to polycondensation for the complexing to and inactivation of the reesterification catalyst. U.S. Pat. No. 4,254,018, European patent, EP 0 699 700 A, and Japanese patent JP 49-125 494 A describe compounds where $R^1$, $R^2$, $R^3$ are alkyl groups and U.S. Pat. No. 3,169,944 describes compounds where $R^1$, $R^2$, $R^3$ are —H or alkyl groups. In no example are $R^1$, $R^2$, $R^3$ all hydrogen. None of these references describes the production of POY fibers or stretch texturing.

U.S. Pat. No. 4,086,208 describes the addition, at the beginning of the esterification or reesterification, of 500 to 50,000 ppm of phosphorus of the compound above, wherein $R^1$, $R^2$ and $R^3$ are hydrocarbon radical or —H. Subsequent polycondensation followed by conventional methods of spinning and stretching produces polyester fibers with improved flame resistance. Examples with compounds in which $R^1$, $R^2$ and $R^3$ are hydrogen are absent in these references. Also, neither stretch texturing speeds of over 500 m/min. nor the production of POY fibers suited to stretch texturing is disclosed.

SUMMARY OF THE INVENTION

The present invention comprises a pre-oriented, undrawn polyester fiber, spun at spooling speeds of at least 3000 meters of fiber produced per minute (m/min), which is suitable for further processing by stretch texturing at speeds of over 500 m/min. The present invention is also a process for the production POY polyester.

The pre-oriented, undrawn polyester fiber of the present invention is comprised of a polyester that is a copolymer of predominantly ethylene terephthalate units and up to 10 weight % of other dicarboxylic acids or diols, as well as carboxy phosphonic acid units of the formula:

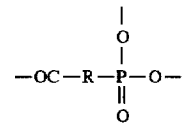

where R=$C_{1-10}$-alkylene, $C_{1-10}$-cycloalkylene or $C_{6-10}$-arylene. The quantity of the carboxy phosphonic acid used is from about 30 to about 500 ppm, preferably from about 60 to about 300 ppm phosphorus, in relation to polyester.

The present invention also comprises a process for the formation of POY polyester by esterification of terephthalic acid with ethylene glycol followed by precondensation, polycondensation and spinning the melt of the polyester obtained at spooling speeds of at least 3000 m/min. The present invention is further characterized by the addition of a carboxy phosphonic acid compound of the formula:

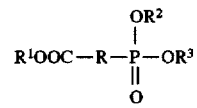

to the reaction mixture before the precondensation step. Two of the three groups, consisting of $R^1$, $R^2$, and $R^3$, are —H and the third group is selected from the group comprising —H, $C_{1-10}$-alkyl, $C_{1-10}$-cycloalkyl and $C_{6-10}$-aryl. R is selected from the group comprising $C_{1-10}$-alkylene, $C_{1-10}$-cycloalkylene and $C_{6-10}$-arylene. The quantity of the carboxy phosphonic acid used in the method of the present invention is from about 30 to about 500 ppm, preferably from about 60 to about 300 ppm phosphorus, in relation to polyester.

DETAILED DESCRIPTION OF THE PREFERRED EMBODIMENTS

It has been found, surprisingly, that polyesters containing carboxyl phosphonic acid units in accordance with the present invention can be spun into POY fibers of high uniformity at spooling speeds of at least 3000 m/min. The spinning can be performed at conventional temperatures (280° to 310° C.) depending on the co-monomer used. These POY fibers have a higher breaking elongation value than fibers of non-modified polyethylene terephthalate that are spun under the same conditions. Furthermore, these POY fibers can be processed into DT- or DTY- thread by means of stretch twisting or, preferably, stretch texturing, at speeds of greater than 500 m/min. Stretch texturing is preferably performed at greater than 600 m/min and yields fibers with a normal elongation and good resistance strength. POY fibers with at least 98 weight % of ethylene terephthalate units, which are spun at 3200 m/min form polyester in accordance with the invention, have a breaking elongation of at least 130%. The DTY threads thereby produced have a elongation of approximately 20 to 25%, like traditionally produced threads, and a resistance strength above 40 cN/tex, which is greater than traditionally produced threads. The excellent stretchability of the POY fibers produced in accordance with the method of the present invention permits a spinning output of up to approximately 10% greater than traditional methods. The POY fibers are spun with a higher titer, which is reduced to the normal titer in a subsequent stretching process. Even upon further processing, such as weaving or warp effects, it was possible to obtain a reduced fault rate and an increased rate of production.

Melt extrusion can be performed by any manner known to those of ordinary skill in the art, such as the processes of U.S. Pat. Nos. 4,940,559 or 5,340,517. Utilizing these methods, the polyester melt can be spun directly after polycondensation. Alternatively, the melt may be first granulated, re-melted and then spun. The stretch twisting or the stretch texturing may be performed by normal commercial devices, preferably at high processing speeds.

Polyester may be produced, either continuously or discontinuously, through the direct esterification of terephthalic acid or 2,6-naphthalene dicarboxylic acid with ethylene glycol. Esterification is followed by precondensation and polycondensation. In the present invention, a carboxy phosphonic acid compound is added to the reaction mixture, prior to precondensation, at the beginning of or during the esterification. Preferably the carboxy phosphonic acid is added when approximately 50 to 80% of the carboxyl groups of the polyester-forming dicarboxylic acid or acids have been esterified. The degree of esterification (U) can thereby be computed from the saponification number ($V_z$) and the acid number ($S_z$) of the reaction mixtures in accordance with the formula $U=(V_z-S_z)\times 100/V_z$. The saponification number is determined by means of saponification with potassium hydroxide in n-propanol followed by potentiometric titration. The acid number is determined by potentiometric titration in dimethyl formamide.

Dicarboxylic acid or ethylene glycol can be replaced by other dicarboxylic acids and/or diols, such as, isophthalic acid, terephthalic acid, 1,4-cyclohexanedicarboxylic acid, 2,6-naphthalene dicarboxylic acid, p-hydroxy benzoic acid, 4,4'-biphenyldicarboxylic acid, adipic acid, diethylene glycol, 1,4-butanediol, 1,4-cyclohexane dimethanol, or polyglycol with a molecular weight under 1000. The portion of these co-monomers should not exceed approximately 10 weight % of polyester, otherwise the mechanical and thermal characteristics of the polyester fibers produced deteriorate in comparison with polyethylene terephthalate fibers. The preferred polyester produced by the method of the present invention is polyethylene terephthalate. The condensation is carried out in the presence of conventional catalysts, such as antimony, titanium and/or germanium compounds. Pigments such as titanium oxide and, if applicable, coloring agents, can be added to the reaction mixture.

Surprisingly, the reaction mixture in accordance with the present invention polycondenses more rapidly than reaction mixtures without carboxy phosphonic acid compound. The desired polyester end viscosity is attained in a precondensation and polycondensation reaction time, which take up to 10% less time than by conventional techniques. The accelerating effect is more strongly pronounced in solid phase polycondensation.

Addition of the carboxy phosphonic acid compound prior to polycondensation assures complete incorporation of the carboxy phosphonic acid compound into the polyester molecule accompanied by the formation of long chain branchings. These long chain branchings lead to a change in the visco-elasticity of the polyester. The polyester melt becomes compressible and can absorb pressure oscillations of the polyester melt and dampen these oscillations as well as the fiber vibrations that arise during the spinning. This property ensures the production of more uniform POY fibers. Furthermore, the incorporation of the carboxy phosphonic acid compound into the polymer molecule leads to permanent thermal and thermo-oxidative stabilization of the polyester. Conventional stabilizers, such as phosphorous acid, phosphoric acid, or their esters can be added but are normally not required because the carboxy phosphonic acid compounds have a stabilizing effect.

The carboxy phosphonic acid compound is preferably used as the free acid:

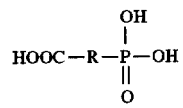

where R is a $C_{1-10}$-alkylene-(preferably ethylene), $C_{1-10}$-cycloalkylene or $C_{6-10}$-arylene group. One of the three acid groups can also be present as $C_{,1-10}$-alkyl—, $C_{1-10}$-cycloalkyl or $C_{6-10}$-aryl-ester group, particularly as an ethylester group. The esterified group can be both the carboxyl group as well as one of the acid groups of the phosphonic acid. In this case, the co-polymerization and the long-chain branching takes place through direct esterification as well as by reesterification. Since the esterification proceeds more easily than the non-catalyzed reesterification, a certain control of the type of branching is possible. The quantity of carboxy phosphonic acid compound that is to be added to the reaction is from about 30 to about 500 ppm, preferably from about 60 to about 300 ppm phosphorus, in relation to the polyester. The precise quantity depends to some extent on the selection of the co-monomer portion of the polyester. For polyesters with at least a 98 weight % of ethylene terephthalate units, the preferred range is from about 100 to about 150 ppm phosphorus. Too little carboxy phosphonic acid compound produces POY fibers with elongation properties that are insufficient for high speed stretch texturing. Too much carboxy phosphonic acid compound reduces the resistance strength of the DTY thread such that ultimately the polyester is no longer uniformly spinnable. Since the carboxy phosphonic acid compounds are neither volatile, nor form volatile compounds under the conditions of the polyester synthesis, the metering thereof can be carried out without consideration of possible losses. Also, if the non-purified split glycol is recycled during the polyester production process, no disturbances of the polyester process arise through carboxy phosphonic acid compounds entrained within the split glycol.

The invention will be illustrated in further detail in the following by means of examples.

EXAMPLES

The following examples illustrate preferred embodiments of this invention as well as preferred methods for using compositions of this invention. In the following examples the parameters reported were measured as described below.

The intrinsic viscosity (I.V.) was measured at 25° C. in a solution of 500 mg polyester in 100 ml of a mixture of phenol and 1,2-dichlorobenzene (3:2 weight parts).

The diethylene glycol (DEG) contained in the polyester was determined by gas chromatographic means in the reesterification mixture of 1 g polyester with 30 ml methanol and 50 mg/l of zinc acetate, obtained in the Carius tube at 200° C.

The determination of the resistance strength and of the breaking elongation of the fibers was carried out at room temperature on a test length of 200 mm of POY or 500 mm of DTY. Drawing speed was 2000 min/min. for POY and 1500 mm/min. for DTY.

EXAMPLES 1 to 4

212 kg of terephthalic acid, 88 kg of ethylene glycol, and 5.5 kg of 2% antimony acetate, in a solution of ethylene glycol, were homogeneously mixed under agitation. The mixture was fed, at atmospheric pressure within about 140 min., into an esterification reactor, preheated to approximately 265° C., and filled to approximately 30% with pre-condensate of the previous batch along with 3 kg of a 25% titanium dioxide suspension in ethylene glycol. The mixture was esterified for 30 min., at 265° C. and normal pressure, with separation of the reaction water. After adding 14 g of phosphoric acid, precondensation was accomplished within 30 min. by the gradual decrease of pressure to 50 mbar (abs.) and the simultaneous increase of the temperature to approx. 275° C. The precondensate was transferred through a 15 μm filter into the polycondensation reactor. Then the pressure was reduced to less than 2 mbar (abs.) and the temperature increased to approx. 280° C. within 45 min. Polycondensation was performed until the desired intrinsic viscosity of approximately 0.65 dl/g was attained. Thereafter, the polyester was discharged from the polycondensation reactor within 20 min. and granulated.

The granulate was melted in a melt extruder and the melt spun at approximately 295° C. through a 34-aperture nozzle (aperture diameter=0.25 mm). The fibers were cooled in a transverse current blowing duct, subsequently provided with a preparation (type: Zimmer K 105), bundled, conducted into a drawing-off machine with a galette duo wrapped around 9 times, and then, finally, wound up.

The stretch texturing of the POY fibers was performed using a friction texturing machine, (Model: FK6-S-900; Barmag, Remscheid, Germany) with a 1-7-1 provision of ceramic disks (Ceratex C 0.85 and SPK-C 0.85-M; Ceram Tec AG, Plochingen, Germany). The temperature of the first and second heater was 195° C. and 160° C., respectively. The D/Y ratio was 1: 2.15. The fiber characteristics are listed in Table 1.

TABLE 1

| Comparative Example - Number | 1 | 2 | 3 | 4 |
| --- | --- | --- | --- | --- |
| Esterification: | | | | |
| CEPS [g] | — | — | — | — |
| Polyester: | | | | |
| CEPS [ppm P] | — | — | — | — |
| I.V. [dl/g] | 0.65 | 0.65 | 0.65 | 0.65 |
| DEG [mass %] | 0.7 | 0.7 | 0.7 | 0.7 |
| POY thread: | | | | |
| Spooling speed [m/min.] | 3200 | 3200 | 3200 | 3300 |
| Total titer [dtex] | 147 | 131 | 291 | 266 |
| Elongation [%] | 124 | 127 | 139 | 118 |
| Tenacity [cN/tex] | 24.3 | 26 | 24 | 24 |
| DTY thread: | | | | |
| Texturing speed [m/min] | 600 | 700 | 700 | 650 |
| Stretching ratio 1: | 1.66 | 1.64 | 1.69 | 1.65 |
| Total titer [dtex] | 90 | 81 | 175 | 163 |
| Elongation [%] | 24 | 24 | 25 | 24 |
| Tenacity [cN/tex] | 41 | 45 | 36 | 36 |

EXAMPLES 5 to 11

Examples 5–11 were performed in the same manner as Examples 1 to 4, but no phosphoric acid was added. However, 15 min. before the beginning of the gradual reduction of the reaction pressure, the quantities of carboxyethylene phosphonic acid (CEPS) stated in Table 2 were fed into the esterification mixture as warn solution of ethylene glycol (~3 kg). The results are summarized in Table 2.

TABLE 2

| Example number | 5 | 6 | 7 | 8 | 9 | 10 | 11 |
| --- | --- | --- | --- | --- | --- | --- | --- |
| Esterification: | | | | | | | |
| CEPS [g] | 74 | 124 | 161 | 198 | 396 | 124 | 148.5 |
| Polyester: | | | | | | | |
| CEPS [ppm P] | 60 | 100 | 130 | 160 | 320 | 100 | 120 |
| I.V. [dl/g] | 0.63 | 0.63 | 0.63 | 0.66 | 0.66 | 0.63 | 0.64 |
| DEG [mass %] | 0.7 | 0.61 | 1.07 | 1.54 | 1.13 | 0.61 | 0.86 |
| POY thread: | | | | | | | |
| Spooling speed [m/min.] | 3200 | 3200 | 3200 | 3200 | (*) | 3200 | 3300 |
| Total titer [dtex] | 147 | 142 | 146 | 145 | | 300 | 287 |
| Elongation [%] | 126 | 141 | 136 | 145 | | 146 | 130 |
| Tenacity [cN/tex] | 25.5 | 25 | 25.2 | 22 | | 23 | 22 |
| DTY thread: | | | | | | | |
| Texturing speed [m/min] | 800 | 900 | 800 | 800 | (*) | 900 | 900 |
| Stretching ratio 1: | 1.73 | 1.72 | 1.73 | 1.73 | | 1.74 | 1.73 |
| Total titer [dtex] | 88 | 84 | 88 | 90 | | 1.74 | 168 |
| Elongation [%] | 22 | 20 | 25 | 29 | | 25 | 34 |
| Tenacity [cN/tex] | 42 | 41 | 42 | 36 | | 34 | 24 |

(*) Spinnability was poor and irregular.

Comparison of Examples 5 to 9 with Examples 1 to 4 shows the addition of carboxy ethylene phosphonic acid, in accordance with method of the present invention leads to higher elongation values of the POY. Smaller carboxy ethylene phosphonic acid quantities (below approximately 60 ppm P) produces no measurable effect. Higher quantities (above approximately 320 ppm P) strongly impairs the spinnability of the polyester. The higher elongation values of the POY thread make possible stretch texturing with approximately ⅓ higher texturing speed and with a stretching ratio approximately 5% higher than conventional methods. Quantities of up to approximately 140 ppm P demonstrate the improved qualities of the POY fiber without impairing DTY characteristics. Addition of larger quantities (approximately 160 ppm P) cause the gradual deterioration of DTY thread resistance strength. Because of the higher stretching ratio, it is possible, with a pre-determined DTY titer, to spin a higher POY titer and thereby increase throughput, thus making the process more economical.

We claim:

1. A process for the production of a pre-oriented, undrawn polyester fiber comprising:

esterification of terephthalic acid with ethylene glycol to produce an esterification mixture;

precondensation and polycondensation of the esterification mixture to produce a polyester; and spinning the melt of the polyester at spooling speeds of at least 3000 m/min to produce a pre-oriented, undrawn polyester fiber, wherein prior to precondensation, from about 30 to about 500 ppm of phosphorus contained in a carboxy phosphonic acid compound of the formula:

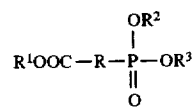

is added to the esterification mixture wherein R is selected from the group consisting of $C_{1-10}$-alkylene, $C_{1-10}$-cycloalkylene, and $C_{6-10}$-arylene and $R^1$, $R^2$, and $R^3$ are selected from the group consisting of hydrogen, $C_{1-10}$-alkyl, $C_{1-10}$cycloalkyl, and $C_{6-10}$-aryl, provided that at least two of $R^1$, $R^2$, and $R^3$ are hydrogen.

2. The process of claim 1, wherein the terephthalic acid and/or the ethylene glycol are replaced with other dicarboxylic acids, other diols or mixtures thereof in an amount of up to 10 weight percent.

3. The process of claim 2 wherein the carboxy phosphonic acid compound is added when approximately 50 to 80% of the carboxyl groups of the terephthalic acid and the other dicarboxylic acid are esterified.

4. The process of claim 1 wherein the quantity of carboxy phosphonic acid compound added to the esterification mixture contains from about 60 to about 300 ppm phosphorus in relation to polyester.

5. The process claim 1, wherein R is $-CH_2CH_2-$.

6. A process for the production of a draw-textured polyester yarn, comprising the process according to claim 1, followed by stretch-texturing at a speed of at least 500 m/min.

* * * * *